United States Patent
Weber

(10) Patent No.: US 6,892,757 B2
(45) Date of Patent: May 17, 2005

(54) HYDRAULIC VALVE

(76) Inventor: Gisela Weber, Hauptplatz 23, A-2474 Gattendorf (AT)

( * ) Notice: Subject to any disclaimer, the term of this patent is extended or adjusted under 35 U.S.C. 154(b) by 0 days.

(21) Appl. No.: 10/380,079
(22) PCT Filed: Aug. 21, 2001
(86) PCT No.: PCT/AT01/00270
§ 371 (c)(1), (2), (4) Date: Feb. 22, 2003
(87) PCT Pub. No.: WO02/16813
PCT Pub. Date: Feb. 28, 2002

(65) Prior Publication Data
US 2004/0011406 A1 Jan. 22, 2004

(30) Foreign Application Priority Data
Aug. 23, 2000 (AT) .................................. A 1452/2000
Jun. 15, 2001 (AT) .................................. A 931/2001

(51) Int. Cl.⁷ .................................................. F16K 17/30
(52) U.S. Cl. .................... 137/517; 137/498; 137/541; 251/337
(58) Field of Search ................. 137/498, 517, 137/504, 541, 542; 251/337

(56) References Cited
U.S. PATENT DOCUMENTS

| | | | | |
|---|---|---|---|---|
| 2,204,757 A | | 6/1940 | Henze | |
| 2,357,321 A | * | 9/1944 | Fuller | 137/460 |
| 3,331,389 A | * | 7/1967 | Kirk | 137/516.11 |
| 3,379,213 A | * | 4/1968 | Billington | 137/515.5 |
| 3,749,122 A | | 7/1973 | Gold | |
| 4,269,215 A | * | 5/1981 | Odar | 137/75 |
| 5,293,898 A | * | 3/1994 | Masloff | 137/517 |

FOREIGN PATENT DOCUMENTS

| | | |
|---|---|---|
| DE | 855186 | 3/1952 |
| FR | 1257824 | 2/1961 |
| FR | 2 636 379 | * 3/1990 |
| GB | 556863 | 10/1943 |

* cited by examiner

Primary Examiner—Ramesh Krishnamurthy
(74) Attorney, Agent, or Firm—Karl Hormann

(57) ABSTRACT

Hydraulic valve with a valve chest (1) provided with a substantially cylindrical internal chamber (5) which may be closed by a valve disc (9) which with its conical rim (9') engages the facial rim of the internal chamber (5), an insert member (3) being arranged in a section of the internal chamber (5) and structured as a member of sprocket-like cross-section with circular gaps (3") between teeth forming valve passages (4) with the internal wall of the chest, the valve disc stem (6) permeating the insert member (3) being a one-piece structure and provided with a safety nut (7).

6 Claims, 5 Drawing Sheets

HYDRAULIC VALVE

BACKGROUND OF THE INVENTION

1. Field of the Invention

The invention relates to a hydraulic valve, in particular a pipe rupture valve, provided with a valve chest having a substantially cylindrical internal chamber which may be closed by a valve disc supported by a central stem and biased into an open position by a valve spring circumscribing the stem and with an insert member arranged in the internal chamber and provided with valve passages disposed adjacent each other in a circular arrangement, with the valve disc stem permeating the insert member and being provided with an adjustment head.

2. The Prior Art

British patent 556, 863 discloses a valve of this kind which is of relatively complex internal structure because its valve stem is structured of multiple parts and because the components have to be assembled and connected with each other from the two ends of the valve chest. In addition, the valve disc closes by surface engagement with a conical internal chamber of the chest which entails the possibility of imperfect closure. Finally, in the known valve the internal chamber must be machined from two sides for forming the cone and a section of the internal chamber for receiving the insert member, this being time consuming and cost inefficient.

OBJECTS OF THE INVENTION

It is an object of the invention to overcome these drawbacks. The object is accomplished in a valve of the kind referred to supra, by the conical rim of a valve disc engaging a facial edge of the internal chamber and by the insert member being arranged in a section of the internal chamber and being structured as a member of sprocket-like cross-section provided with circular gaps between its teeth which, with the interior surface of the chest, are forming valve passages, with the valve disc stem permeating the insert member being of single-piece construction provided, at the exterior surface of the valve disc, with an adjustable safety nut, and by the end of the valve member opposite the valve disc being provided, as is well-known, with an externally threaded section and an internal cone of the valve chamber for receiving a conical compression ring circumscribing a connection pipe and maintained in engagement with the internal cone by a nut threaded onto the threaded section.

Preferably, the insert member is positioned in the section of the internal chamber for axial movement relative to a snap ring.

It is a further object of the invention to provide an alternative hydraulic valve of the kind referred to supra which is characterized by the conical rim of the valve disc engaging the facial rim of the internal chamber of the chest and by the insert member being disposed in a section of the internal chamber for axial movement relative to a snap ring and structured as a member of sprocket-like cross-section with circular gaps between teeth forming, with the internal wall of the chest, valve passages, whereby the valve disc stem permeating the insert member is provided with an adjustable safety nut.

By the simple structure in accordance with the invention consisting of but few components overall, processing or machining of the chest need only be performed from one end in view of the fact that the valve passages are formed in a separate insert member and, depending upon given requirements, different insert members with passages of different sizes may be used. Furthermore, a particular advantage of the structure in accordance with the invention is that if the insert member has axial play, the insert member, when subjected to the pressure of fluid flowing from the pump, will be moved in the direction of the snap ring into an abutting position in which the cross-section of the valve bore is increased.

A further object of the invention is a hydraulic valve of the kind referred to supra with the characteristics of the conical rim of the valve disc engaging the facial rim of the internal chamber of the chest, of the insert member being disposed with axial play in a section of the internal chamber and formed as a member of sprocket-like cross-section with circular gaps between teeth thereof forming valve passages with the internal wall of the chest, the valve disc stem penetrating the insert member being a single-piece structure and provided at the internal surface of the insert member with an adjustable safety nut, and by the insert member being in positive engagement with the internal wall of the chest and with the valve disc stem.

DESCRIPTION OF THE SEVERAL DRAWINGS

The novel features which are considered to be characteristic of the invention are set forth with particularity in the appended claims. The invention itself, however, in respect of its structure, construction and layout as well as manufacturing techniques, together with other objects and advantages thereof, will be best understood from the following description of preferred embodiments when read in connection with the appended drawings, in which:

DETAILED DESCRIPTION OF PREFERRED EMBODIMENTS

Figure 1:
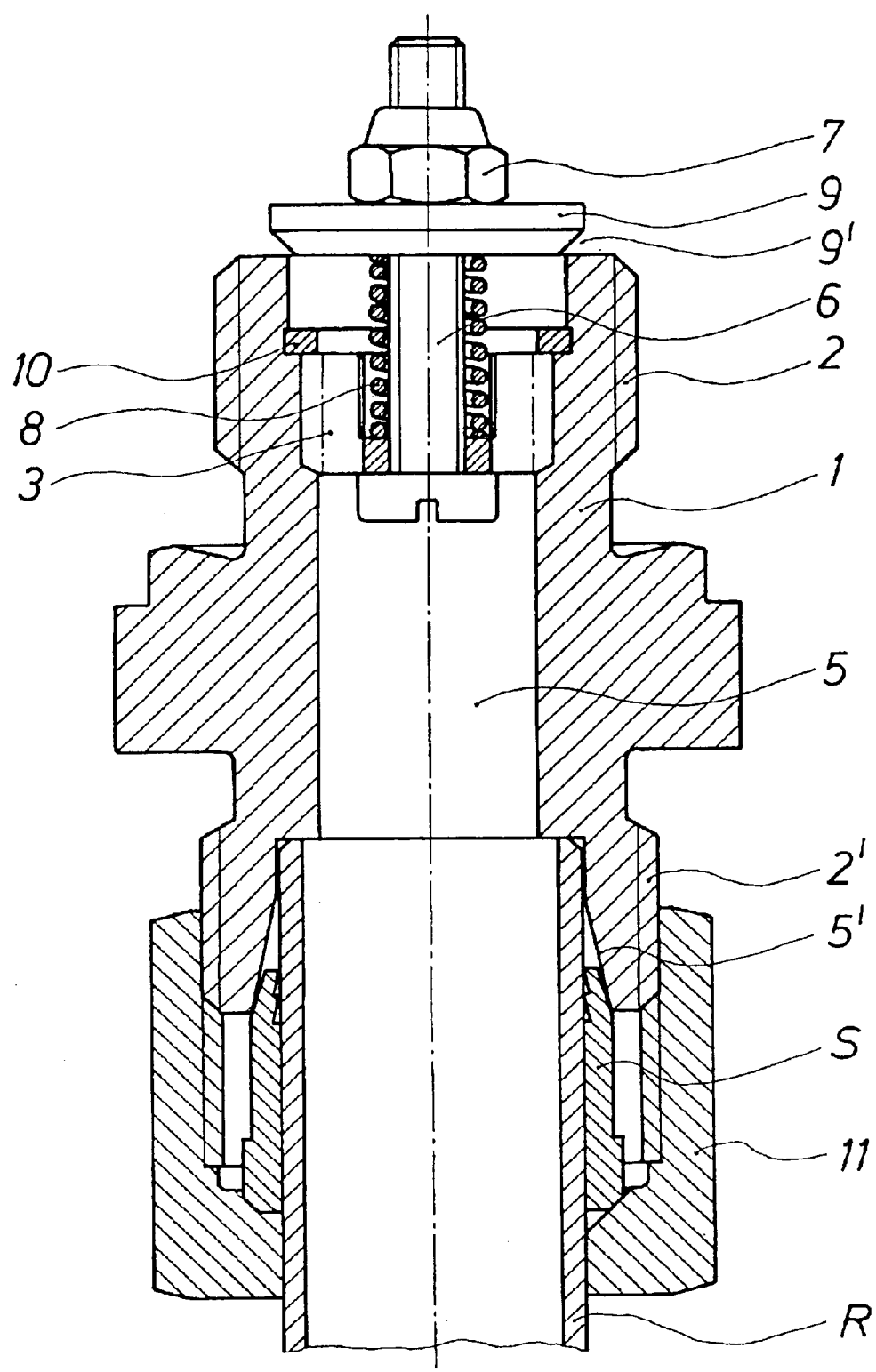
FIG. 1 is an axial section of a valve in accordance with the invention.

The pipe rupture valve shown has a cylindrical valve chest 1 for threaded connection by an external thread section 2 at one end and an external thread section 2' at the other end. In a valve insert member 3 disposed in the internal chamber 5 of the chest, there are formed hydraulic medium passages 4 in a circular arrangement adjacent each other. The valve insert member 3 is permeated by a screw threaded valve stem 6 which supports a valve disc 9 and which with a screw head 6' engages the side of the insert member 3 opposite the valve disc 9 and which is adjustably secured to the valve disc 9 by a safety nut 7. The valve stem 6 or the insert member 3 support a valve spring 8 which terminates at the valve disc 9. In its idle position the valve disc 9 is positioned at a predetermined spacing from the upper side of the chest 1 and is provided with a conical closure rim 9' for sealingly engaging, when impacted by pressure of the medium counteracting the compression spring 8, the face rim 5' of the internal chamber 5 as a result of a ruptured pipe at the intake side of the valve (arrow P). The medium pressure may originate, for instance, with a hydraulic lift cylinder (not shown).

Figure 3:
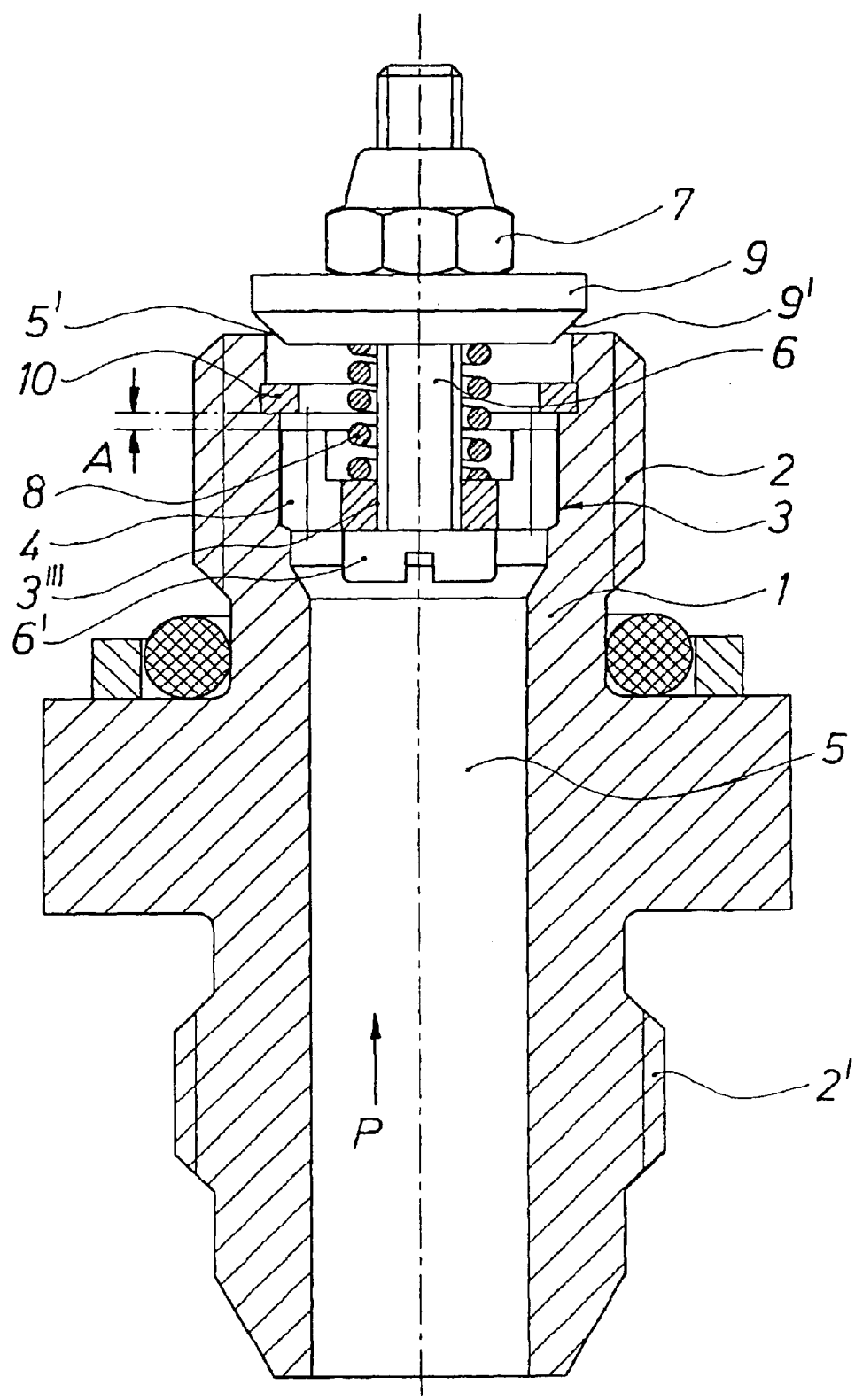
FIG. 3 is a view in axial section of a second embodiment of the invention.
Figure 4:
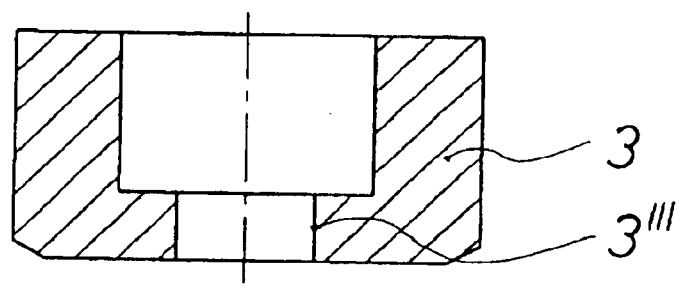
FIG. 4 is an axial section along line IV—IV of FIG. 5.

An insert member 3 is retained within a section of the internal chamber 5 of the chest by means of a snap ring 10. As shown in FIGS. 3 and 4, the shape of the valve insert member 3 is substantially cylindrical and sprocket-like cross-section with teeth 3' and, between the teeth, gaps 3" of circular contour. The gaps 3" and the internal wall of the chest form valve passages 4.

Figure 2:
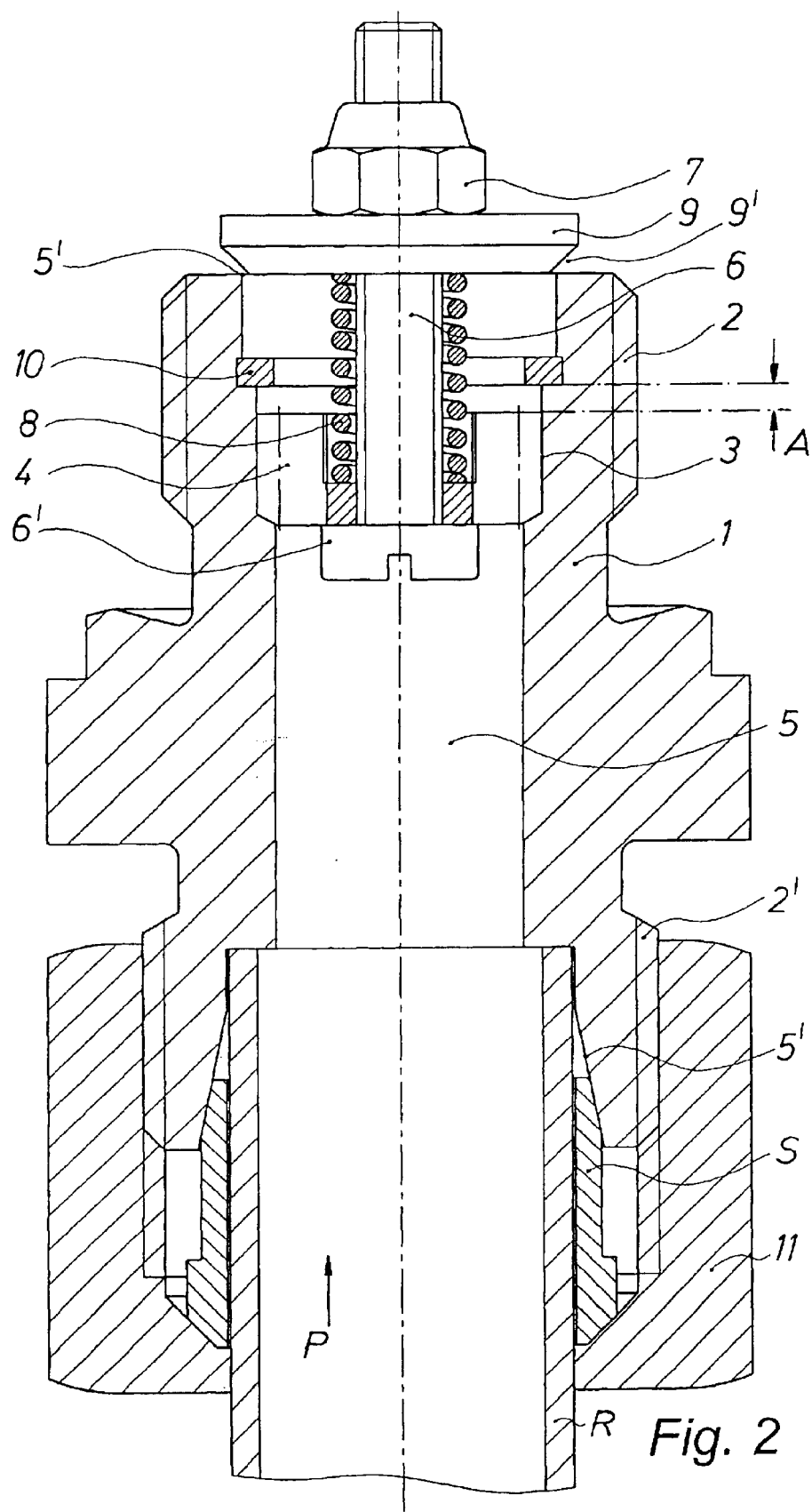
FIG. 2 is an alternative embodiment.

In accordance with FIG. 2, the insert 3 is provided with predetermined axial play A relative to the snap ring 10, so that when subjected to flow pressure in the direction of arrow P (from the pump) the insert engages the snap ring 10 thereby enlarging the flow cross-section between the rim 9' of the valve disc and rim 5'.

In the embodiment shown in FIGS. 1 and 2, a pipe R is inserted in the lower end of the valve chest 1. At its exterior the pipe R is surrounded by a conical compression ring S which protrudes into an internal conical section 5' of the valve bore 5. The pipe R and the compression ring S are secured by a nut 11 seated on the thread 2' of the valve chest 1. This construction prevents the escape of leaking oil from the valve by way of the thread 2', for instance, as might occur if the valve chest were screwed into a bore in the usual manner.

Figure 5:
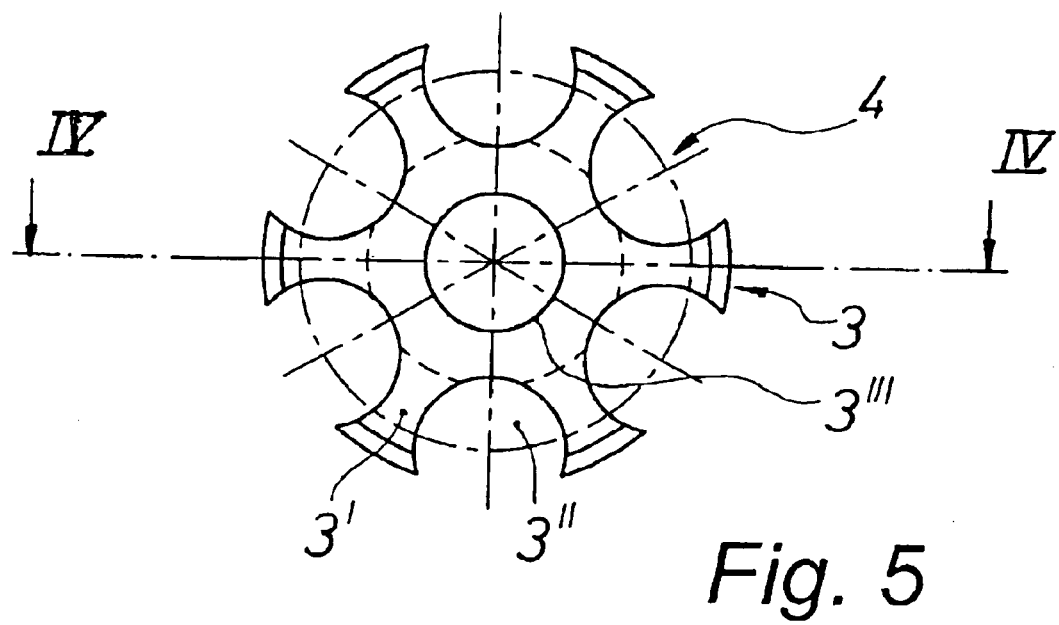
FIG. 5 is a planar view of the insert member.

FIG. 5 depicts an embodiment of the valve in accordance with the invention without any connected pipe, but with an insert member 3 arranged with axial play.

Figure 7:
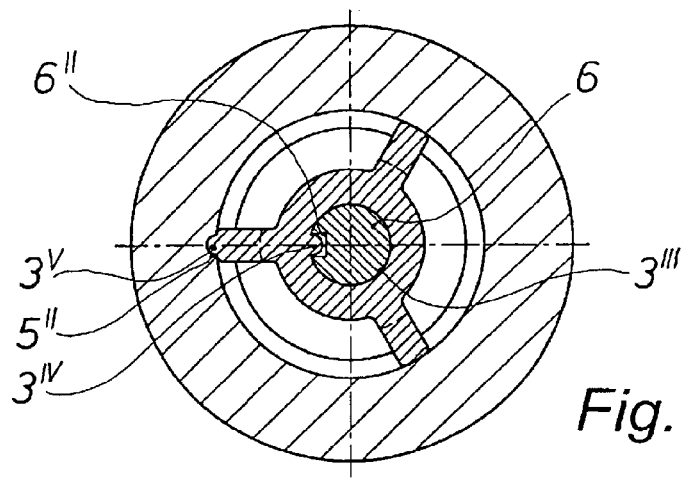
FIG. 7 is a section along line VII—VII of FIG. 6.
Figure 6:
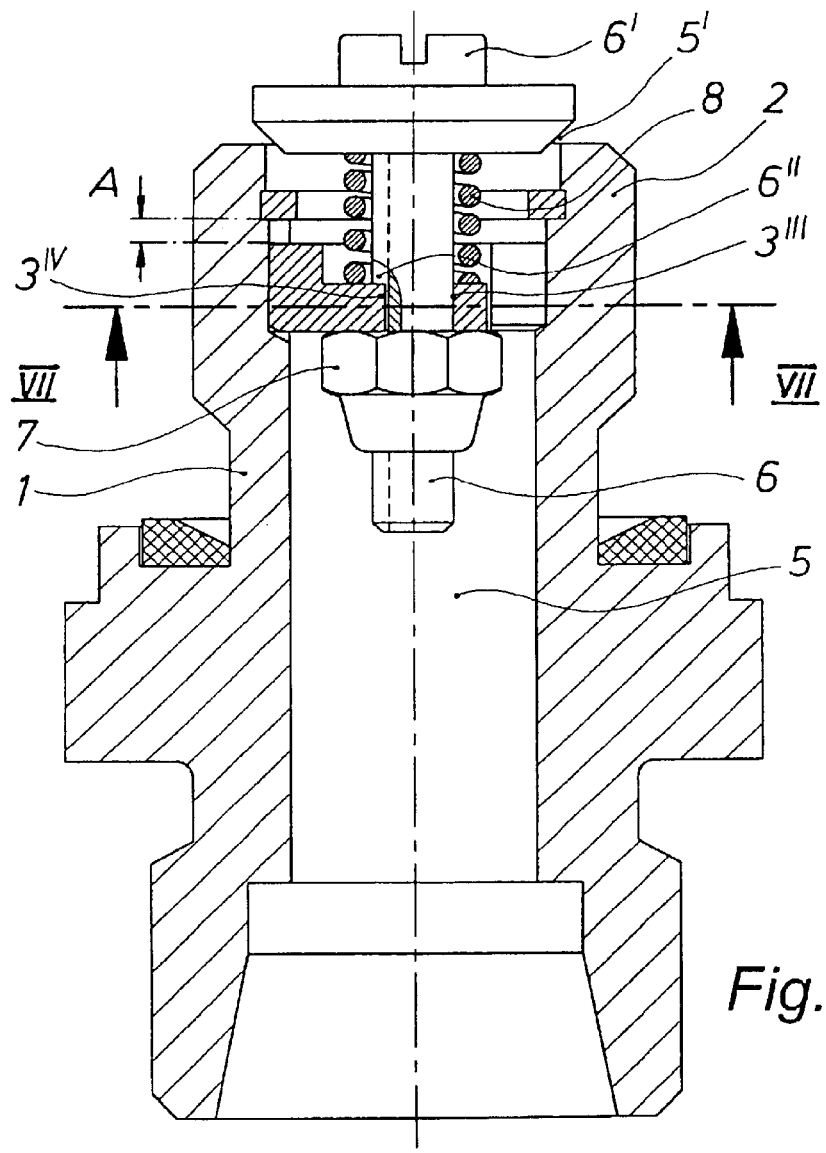
FIG. 6 is an axial section of a third embodiment.

FIGS. 6 and 7 depict a further embodiment of the invention, in which the valve stem 6 permeating the insert member 3 is provided with the safety nut 7 at the internal face of the insert member 3. The central bore 3''' of the insert member 3 is provided with an axial rib 3$^{iv}$ which penetrates into an axial groove 6' of the valve stem shaft 6. At its periphery the insert member 3 is further provided with an axial rib 3V which engages an axial groove 5" of the internal wall of the chest. In this manner the insert member 3 is positively secured against rotation, and the valve may be adjusted without having to be disassembled.

What is claimed is:

1. A hydraulic valve, comprising:
   a valve chest forming a substantially cylindrical internal chamber terminating at one end in a facial rim and at the other end with an externally threaded section and a conical opening for receiving a compression ring surrounding a connecting pipe retained in engagement with the conical opening by a nut threaded onto the threaded section;
   a snap ring mounted coaxially in the chamber;
   a valve disc provided with a conical rim and mounted for movement relative to the chamber between an open position in which the conical rim is removed from the facial rim and a closed position in which the conical rim engages the facial rim;
   a cylindrical insert member of substantially sprocket-like cross-section for forming a plurality of valve passages with the internal wall of the chamber permeated by the valve stem and mounted in the chamber for movement against and away from the snap ring;
   a valve stem for supporting the valve disc and permeating the insert member;
   a safety nut provided on the valve stem at a face of the valve disc opposite the chamber; and
   a valve spring circumscribing the stem for biasing the valve disc into the open position thereof.

2. The hydraulic valve of claim 1, wherein the diameter of the insert member substantially equals the diameter of the chamber.

3. The hydraulic valve of claim 2, wherein the valve passages are radial recesses of substantially circular cross-section in the insert member open to the periphery thereof and extending axially thereof.

4. The hydraulic valve of claim 3, wherein the valve stem is of one-piece structure.

5. The hydraulic valve of claim 4, wherein one of the insert member and valve stem is provided with a radial protrusion and the other is provided with an axial groove for receiving the protrusion.

6. The hydraulic valve of claim 5, wherein one of the insert member and the internal wall of the chamber is provided with a radial protrusion and the other is provided with an axial groove for receiving the protrusion.

* * * * *